United States Patent
Dempsey et al.

(10) Patent No.: US 6,499,136 B1
(45) Date of Patent: Dec. 24, 2002

(54) SINGLE-SHOT ENTRY CODE FOR SOFTWARE STATE TRANSITION

(75) Inventors: Peter Allen Dempsey, Convent Station, NJ (US); Salvatore John Iaccarino, Ramsey, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/437,959

(22) Filed: Nov. 10, 1999

(51) Int. Cl.$^7$ ................................................ G06F 9/45
(52) U.S. Cl. ........................ 717/127; 717/100; 717/126
(58) Field of Search ..................... 717/127, 128, 717/131, 140, 141, 142, 151, 154, 165, 108, 126, 100, 116; 707/203, 500

(56) References Cited

U.S. PATENT DOCUMENTS

| | | | | |
|---|---|---|---|---|
| 5,291,427 A | * | 3/1994 | Loyer et al. | 703/13 |
| 5,680,619 A | * | 10/1997 | Gudmundson et al. | 717/108 |
| 5,911,041 A | * | 6/1999 | Schaffer | 714/38 |
| 5,920,718 A | * | 7/1999 | Uczekaj et al. | 717/109 |
| 5,946,469 A | * | 8/1999 | Chidester | 703/24 |
| 5,995,753 A | * | 11/1999 | Walker | 717/108 |
| 6,018,627 A | * | 1/2000 | Iyengar et al. | 717/103 |
| 6,038,393 A | * | 3/2000 | Iyengar et al. | 717/104 |
| 6,047,046 A | * | 4/2000 | Smets et al. | 379/88 |
| 6,081,832 A | * | 6/2000 | Gilchrist et al. | 709/206 |
| 6,106,569 A | * | 8/2000 | Bohrer et al. | 717/100 |
| 6,118,448 A | * | 9/2000 | McMillian et al. | 717/127 |
| 6,128,633 A | * | 10/2000 | Michelman et al. | 707/525 |
| 6,182,277 B1 | * | 1/2001 | DeGroot et al. | 717/115 |
| 6,289,502 B1 | * | 9/2001 | Garland et al. | 717/104 |
| 6,353,896 B1 | * | 3/2002 | Holzmann et al. | 714/38 |
| 6,405,361 B1 | * | 6/2002 | Broy et al. | 717/100 |

OTHER PUBLICATIONS

Lavazza et al, "Combining UML and formal notations for modeling real time system", ACM ESEC/FSE, pp 196–206, 2001.*
Ling "Designing data entry programs using state diagram as a common model", IEEE, pp 296–308.*
Chung et al, "Use of state diagram to engineer communication software", ACM Proc. of 3rd Int Conf. SW Eng. pp 215–221, 1978.*
Jagar et al, Using UML fro software process modeling ACM pp 91–108, 2000.*
Courtiat et al, Petri nets are good for protocols, ACM pp 66–74, 1984.*
Dwyer et al, A compact petri net representation for concurrent programs, ACM ICSE, pp 147–157, 1995.*
Cook et al, "Discovering models of software processes from event based data", ACM Trans. on software eng. and meth. vol. 7, No. 3, pp 215–249, Jul. 1998.*
Rumbaugh et al, "object oriented modeling and design" Prentice Hall, 1991.*

* cited by examiner

*Primary Examiner*—Anil Khatri
(74) *Attorney, Agent, or Firm*—Duane, Morris & Heckscher, LLP

(57) ABSTRACT

A computer system runs an applications program generated by an object-oriented software development program. A state transition is made to a state of the applications program from an outside state. All state transitions to the state from outside states are connected to an input of a transition merge point of the state. A merge transition of the merge point is selected in response to the state transition and the merge transition transitions back to the state, wherein the merge transition contains merge transition code which executes during the merge transition.

19 Claims, 2 Drawing Sheets

SINGLE-SHOT ENTRY CODE FOR SOFTWARE STATE TRANSITION

BACKGROUND OF THE INVENTION

1. Field of the Invention

The present invention relates to software state transitions and, in particular, to execution of transition and entry code upon such transitions.

2. Description of the Related Art

Computer programs (software) are typically developed by programmers (program or code developers) writing the code for the program. The code is often written in a high-level language such as C++, Pascal, Fortran, Basic, or Forth. Software developers typically utilize a variety of techniques and tools in developing code, such as a textual programming environment (comprising editors, compilers, source-level debuggers, source management systems, and the like) and a real-time operating system (OS).

Graphical programming tools are also used to generate code. Such tools often provide an object-oriented programming environment, which allows code to be written as a collection of concurrent software objects or actors that communicate by messages. Each actor is a state machine that reacts based on messages received. An actor reacts to a message by transitioning from one state to another state via a state transition, or by executing code and remaining in the same state (a self-transition). An actor or state machine is always "in" a state, as the state transitions are considered to be instantaneous. An actor is in a particular state when there has been a state transition to the state and no transition leaving that state has occurred yet. Actors wait for messages from other actors, and then change states or take other action based on the message.

Both state transitions and self-transitions can cause state transition code to be executed. The way an actor reacts—which transitions and associated transition code is executed—based on a message may be referred to as its behavior. An actor can send messages to itself or to any other actor. Each state of a given state machine or actor can have sub-states, which are themselves states and may also have sub-states.

During coding, the object-oriented code development tool displays, for a given actor, the defined states and state transitions graphically to aid programming. The real-time object-oriented modeling (ROOM) is one object-oriented software development system which is often used as the basis for actual code development tools. In addition to graphical techniques, ROOM uses traditional programming languages to express detailed structure and behavior. For example, C or C++ describes actions to be taken on state transitions or state entry/exit. Further information on ROOM may be found in B. Selic, G. Gullekson, and Paul T. Ward, *Real-Time Object-Oriented Modeling* (John Wiley & Sons, 1994). One code development tool which is based on the ROOM system is ObjecTime® code development software <www.objectime.com>. The output of running a ROOM-type code development tool such as ObjecTime® software is non-executable code written in a high-level language such as C++. A C++ compiler, in conjunction with ObjecTime® software, is therefore needed to compile the generated code into an executable application.

The resulting code generated by such a tool, for a given actor, can therefore be represented by a state diagram having a plurality of states and sub-states, interconnected by a series of state transitions. Referring now to FIG. 1, there is shown a state transition diagram 100 illustrating state transitions and self-transitions in an object-oriented software application developed with an object-oriented code development tool or program such as ObjecTime. State diagram 100 shows three states A, B, and C, where state A comprises sub-states A1 and A2. A state transition is made from state B to sub-state A1, via state transitions 111 and 111'. Similarly, a state transition is made from state C to sub-state A1, by transitions 112 and 112'.

Unlike a state transition, which is from one state to another, a self-transition (e.g. 113) is a transition that begins and ends on the same state. Both a self-transition and a state-change type of transition can cause transition code to be executed during the transition. As mentioned above, this transition code may be coded in a language such as C or C++.

The interaction of several features of typical object-oriented code development languages can give rise to unexpected and undesirable problems. In particular, the interaction of the self-transition, transition-to-history, and entry code features can cause entry code to be erroneously executed due to a self-transition.

Entry code is code associated with a given state that is fired (i.e., executed) every time the state is reached (entered). Similarly, exit code is fired every time a state is left (exited). Entry code is useful where, for example, there are many different state transitions into a state which would cause the same transition code to be executed. In this case, it may be more efficient to put this code in entry code for the state, rather than on all state transitions to the state, so that the code for the behavior has to be written only once, not once for each transition to the state.

For example, referring once more to FIG. 1, sub-state A1 may be a "fault" state reached only when a problem has been detected. The entry code for sub-state A1 may turn on an "emergency" light, while the exit code may turn off the light. The entry code for state A itself may be set to "null" if there is no need for entry code for state A. Entry code is "set to null" by simply coding no entry code for a given state, i.e. it does not exist for a given state. Thus, when states B or C make a state transition to sub-state A1, the code for turning on the emergency light does not need to be duplicated as part of the transition code for each state transition 111', 112', but is only coded once in the entry code for sub-state A1.

As noted above, a self-transition is a transition that begins and ends on the same state. Some object-oriented code development tools offer a transition to history feature. In the transition to history feature, when there is a transition to a state, the state automatically enters the most previously-entered sub-state, unless the state transition specifies otherwise. When a state is reached from an outside state by a state transition for the first time (e.g., the "first time" since initialization or beginning the program or the actor having the state), it has not yet been in a previous sub-state. In this case, no sub-state of the state is automatically entered and the transition to history feature has no effect.

State transitions to a state cause entry code for the state to fire, and, due to the transition to history feature, also cause the entry code for the sub-state to fire. Some self-transitions can also cause entry code to fire, including entry code for a sub-state automatically re-entered as a result of the transition to history feature. However, it is not always desired that entry code fire on self-transition. It is often desirable that entry code fire only when the state or sub-state is entered from a state external to the state. Accordingly, use of both self-transitions/transitions to history and entry code can result in unexpected and undesirable program behavior.

As an example, the state transition diagram 100 of FIG. 1 illustrates a variety of state transitions and self-transitions, and states and sub-states, of a given actor of an applications program. The program may comprise thousands of actors, each characterized by its own state diagram. Suppose state A is in sub-state A1 and is then left, e.g. by a transition to state B. Later, if there is a transition back to state A, the transition to history feature causes the most recent sub-state A1 to be automatically re-entered. This automatic state transition is indicated by the dotted arrow connected to state transition 115, and happens unless the state transition to state A specifies otherwise. When state A1 is entered in this manner, due to transition to history and a self-transition at a higher level, its entry code is fired.

Thus, when a self-transition at a higher level (e.g., state A) occurs, the transition to history feature causes the current sub-state A1 to be entered again as soon as the self-transition at state A occurs. This causes the entry code for both state A and sub-state A1 to be fired each time there is a state A self-transition when state A is in sub-state A1. In this example, when self-transition 113 occurs, the following code is executed in the order shown: sub-state A1 exit code; state A exit code; self-transition 113 transition code; state A entry code; sub-state A1 entry code.

Thus, entry code for a state or sub-state will be fired whenever the state is reached, whether the state is reached from outside by a state transition or due to a self-transition. However, it is not always desired that entry code fire on self-transition. For example, the entry code for a given state such as sub-state A1 may initialize a variable that increments so long as the state is not exited. If there is a self-transition, this can also fire the entry code and re-initialize the variable, even though the variable should not have been re-initialized.

A program using entry code, therefore, may produce unintended or unexpected results when a state's entry code is fired not only when it is reached by an outside transition but also when a self-transition occurs. The code developer may unintentionally introduce such a entry code/self-transition conflict. This problem is exacerbated, due to the transition to history feature, when there are self-transitions at a higher levels, because it is not as easy to recognize such potential problems when there are many hierarchical levels of states and sub-states, and many state transitions and self-transitions. The potential problems and undesirable effects arising from the interaction between self-transitions and entry code can lead to code developers sacrificing one of these features in order to use the other.

SUMMARY

A computer system runs an applications program generated by an object-oriented software development program. A state transition is made to a state of the applications program from an outside state of the applications program. All state transitions to the state from outside states are connected to an input of a choice point of the state. A choice transition of the choice point is selected in response to the state transition and the choice transition transitions back to the state, wherein the choice transition contains choice transition code which fires during the choice transition.

DESCRIPTION OF THE PREFERRED EMBODIMENT

The present invention provides a method that allows the benefit of entry code and self-transitions to be obtained, without experiencing the drawbacks described above. In order to overcome the foregoing problem, a "single-shot" entry code is needed that fires only once, when the state is entered from the outside, but not on a self-transition, especially one involving a transition to history (i.e., a self-transition at a higher level when the state is in a sub-state). As described in further detail below, the present invention provides a single-shot entry code by providing a connection from all entry points into a state to a transition merge point, and running the merged transition from the merge point back to the state.

In one embodiment, the merge point is implemented by a choice point, which is a conditional operation that performs some action based on certain conditions. In particular, an action such as a transition may be taken based on the state of a given condition. The choice point may thus be represented as a graphical "if" statement, meaning that action is taken "if" a given variable or condition is true.

By setting the if-condition to always be true, and adding choice transition code to the "true" transition from the choice point to the state, the choice transition code on the true transition always fires when the state is entered, but not when returning from a transition to history. Thus, the choice transition code on the true transition from the choice point may be considered to be a "single-shot entry code," which performs the function of actual entry code except that it does not fire upon a return from a transition to history. The choice transition code of the present invention fires only when the state is reached by a state transition from an external state, because only such external state transitions are connected to the input of the choice point.

Figure 1:
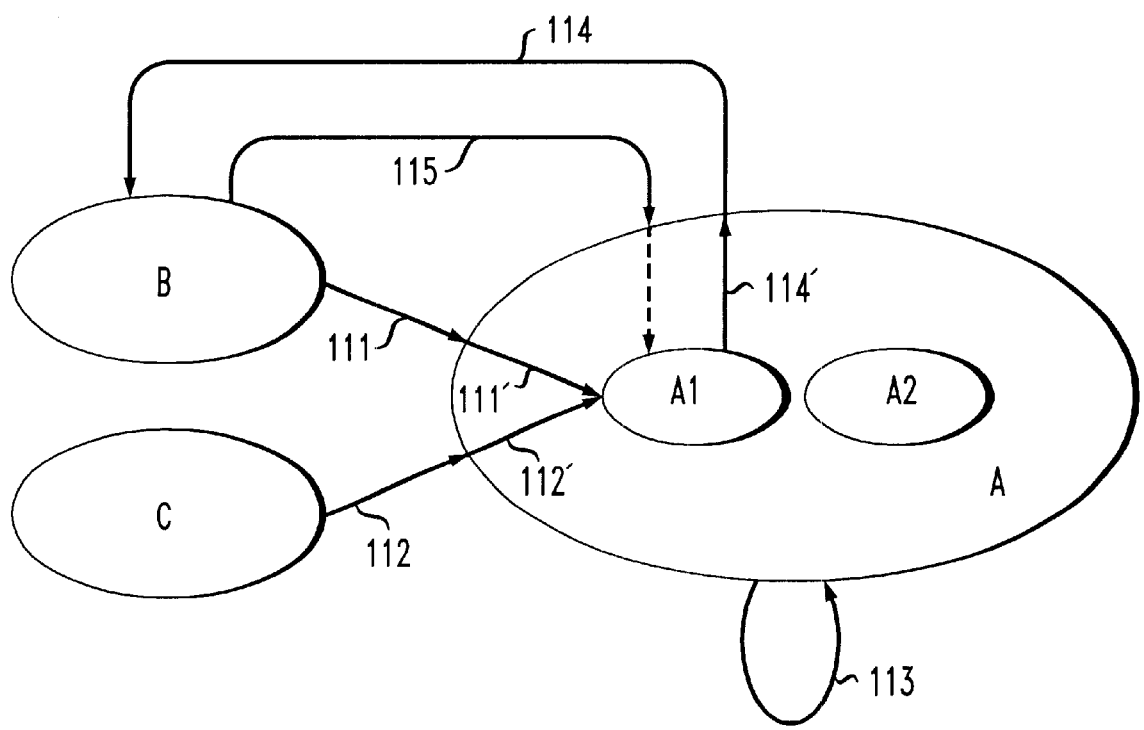
FIG. 1 is a state transition diagram illustrating state transitions and self-transitions in an object-oriented software application.
Figure 2:
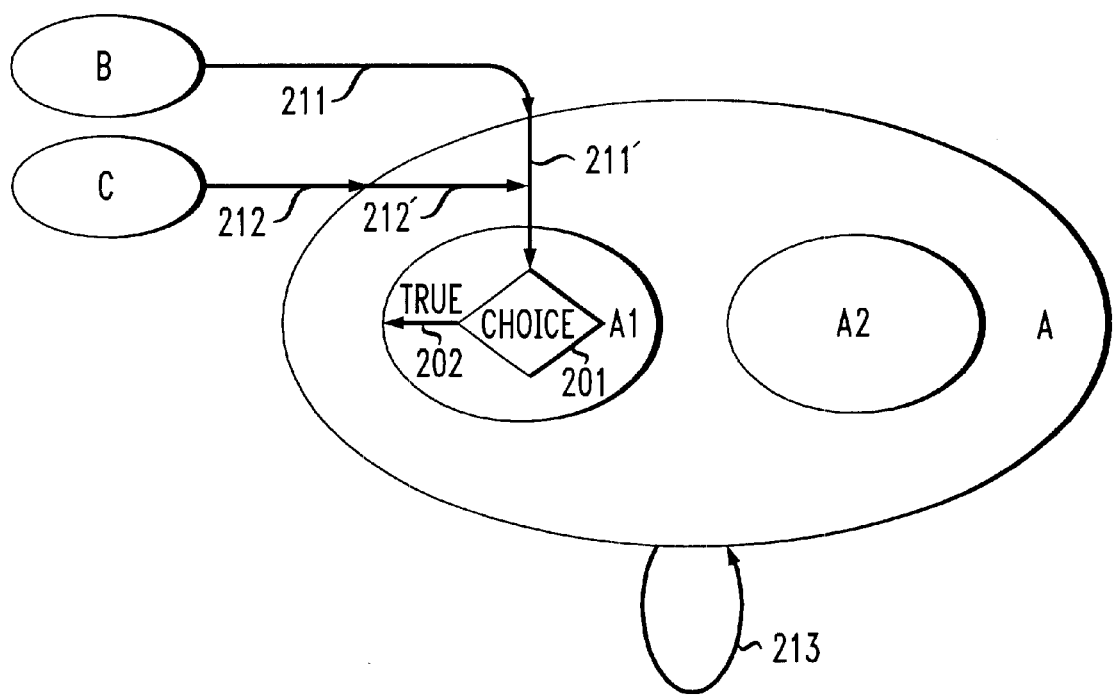
FIG. 2 is a state transition diagram illustrating a single-shot entry code feature of an object-oriented software application, in accordance with an embodiment of the present invention.
Figure 3:
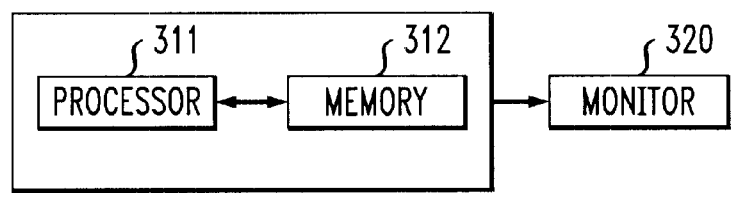
FIG. 3 is a block diagram of a computer system for implementing all or part of the single-shot entry code of the present invention.

Referring now to FIG. 2, there is shown a state diagram 200 illustrating a single-shot entry code feature of an object-oriented software application, in accordance with an embodiment of the present invention. The states illustrated in FIG. 2 illustrate the coding environment of a code development application such as ObjecTime® or another code development tool implementing ROOM, which is used to develop the object-oriented software application. State diagram 200 illustrates the state diagram for a given actor of an applications program. Referring now to FIG. 3, there is shown a computer system 300 comprising any suitable computer such as personal computer (PC) 310, which contains processor 311 and memory 312; and monitor 320. Processor 311 is preferably a general-purpose programmable microprocessor capable of being programmed to implement and run the code development application used by the code developer to write code, i.e. to generate the objected-oriented software application. Monitor 320 may be used to display the visual objects depicted in FIG. 2 during code development. The objected-oriented software application may itself be run on computer 310 as well, after it is compiled and an executable version thereof loaded on computer 310.

Referring once more to FIG. 2, diagram 200 shows three states A, B, and C, where state A comprises sub-states A1 and A2. In the present invention, all entry codes of all states of a given actor or state machine are coded to null, i.e. there is no entry code at all. Whenever an entry code functionality is needed, the single-shot entry code of the present invention is employed instead. This allows an "entry code" type functionality whenever a state transition (i.e., from an outside state) causes a state to be reached, but, unlike entry code, the single-shot entry code does not fire due to self-transitions. Thus, it is "single-shot" in sense that it fires only once, when a state is reached from outside by a state transition, and not during any self-transitions at the level of the state or at higher hierarchical levels of states of which the current state is a sub-state.

To implement the single-shot entry code feature, all entry codes are coded to null. Then, for any state or sub-state requiring a single-shot entry code functionality, a choice point such as choice point 201 of sub-state A1, which implements an "if" testing routine, is provided which has its input connected to all entry points into the state. That is, all state transitions to a sub-state A1, e.g. state transitions 211', 212', from states outside state A, are connected to the input of the single-shot choice point. The "if" condition of the choice point is set to always be "true", and the true transition 202 output is run from the choice point 201 back to the sub-state A1 itself. The single-shot entry code is added to the "true" transition 202. I.e., choice point 201 has a choice transition (e.g., true transition 202) which is always selected by the choice point in response to a state transition that is coupled to its input.

Thus, whenever any outside state such as B or C transitions to sub-state A1, choice point 201 is reached, which always generates true and thus makes a true transition 202. The true transition code (i.e., the single-shot entry code) itself performs the function that was previously performed by normal entry code. Normal entry code is null so there is nothing to fire.

However, when there is a self-transition at higher state A, when state A is in sub-state A1, sub-state A1 is entered again and its entry code, which is null, is fired, but the choice point is not entered because the choice point's input is connected only to state transitions to the sub-state, such as 211', 212', not to self-transitions. Thus, no matter how many times there are self-transitions, even self-transitions with transition to history, the single-shot entry code associated with choice point 201 will not fire. This is because only external state transitions are connected to the input of the choice point. Thus, a self-transition, even with transition to history, cannot cause the choice point to fire its associated choice transition code.

The single-shot entry code of the present invention therefore provides the advantages of entry code without the risk of unexpected interactions with self-transitions and transitions to history. As will be appreciated, the present invention therefore allows for a new class of behavior and improves the quality and readability of the model.

Although described herein with respect to the ROOM methodology and the ObjecTime® implementation thereof, the present invention may be utilized in other object-oriented software development methodologies in which there is unwanted interference between entry code and transitions to history.

In an alternative embodiment, the single-shot code may be placed on the false transition emanating from choice point 201 instead of on the true transition. In this embodiment, choice point 201 is coded so that it always generates false, and the false transition is run back to the state of which it is a part. In general, the single-shot choice point for a given state is connected at its input to all state transitions, and always produces a given output transition, whether true or false. The single-shot code is placed on (associated with) the choice-point output transition, which transitions back to the state of which the choice point is associated (i.e., the state of which the choice point is a part).

As described above, the transition merge point of the present invention is used to merge all entry transitions coming to a given state into a single merge transition which is run back to the state. Merge transition code (the single-shot entry code) executes during this merge transition. Although a choice point is used to implement the graphical merge point in an embodiment, other types of merge points may also be utilized in alternative embodiments, such as other suitable conditionals, or suitably configured sub-states designed to merge all transitions received into a single output or merge transition, which is run back to the state in which the merge point resides. Thus, in the present invention, all state transitions to a state from an outside state are connected to the input of a transition merge point of the state, and the merge point automatically selects a single output merge transition in response to the state transition. This merge transition transitions back to the state itself, and merge transition code of the merge transition executes during the merge transition.

The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium or loaded into and/or executed by a computer. The computer program code embodying the present invention may also be transmitted as a propagated computer data or other signal over some transmission or propagation medium. For example, the signal may be transmitted over electrical wiring or cabling, through fiber optics, or via electromagnetic radiation, or otherwise embodied in a carrier wave. When the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In a system comprising a processor for running a program, a method for performing state transitions between states of the program, the method comprising the steps of:
    (a) performing a state transition to a state from at least one of a plurality of outside states, wherein all state transitions to the state from the plurality of outside states are connected to an input of a transition merge point of the state;

(b) selecting a merge transition of the transition merge point in response to the state transition; and (c) transitioning with the merge transition back to the state, wherein the merge transition contains merge transition code which executes during the merge transition.

2. The method of claim 1, wherein self-transitions from the state to the state are not connected to the input of the transition merge point.

3. The method of claim 1, wherein the merge point is a choice point, the merge transition is a choice transition, the choice transition is a true transition, and the choice point contains an if condition which is set to true.

4. The method of claim 1, wherein the merge transition code is common to all state transitions to the state and executes only when the state is entered via a state transition from an outside state but does not execute when the state executes a self-transition.

5. The method of claim 1, wherein self-transitions and state transitions to a given state cause entry code associated with the state to execute, and all entry codes of all states are coded to null.

6. The method of claim 1, wherein:

the state is a sub-state of a parent state; and the program implements transition to history whereby a self-transition at the parent state when the parent state is in the sub-state causes entry code of the sub-state to execute.

7. The method of claim 1, wherein the program is an objected-oriented program developed with an object-oriented software development program, wherein each state is a state machine describing the behavior of a corresponding software actor of the program.

8. The method of claim 7, wherein the object-oriented software development program is implemented in accordance with the real-time object-oriented modeling (ROOM) methodology.

9. The method of claim 1, wherein the merge point is a choice point.

10. The method of claim 1, wherein states are states of one of a plurality of actors of the program, each actor characterized by a state machine, wherein state transitions are performed by a actor in response to a message received from another actor.

11. In a system comprising a processor for running an object-oriented software development program, a method for generating an applications program, the method comprising the steps of:

(a) providing a state and a plurality of outside states;

(b) connecting all state transitions to the state from outside states to an input of a transition merge point of the state, the merge point having a merge transition which is always selected by the merge point in response to a state transition connected to the input of the merge point; and (c) connecting the merge transition back to the state, wherein the merge transition contains merge transition code which executes during the merge transition.

12. The method of claim 11, wherein self-transitions from the state to the state are not connected to the input of the merge point.

13. The method of claim 11, wherein the merge point is a choice point, the merge transition is a choice transition, the choice transition is a true transition, and the choice point contains an if condition which is set to true.

14. The method of claim 11, wherein the merge transition code is common to all state transitions to the state and executes only when the state is entered via a state transition from an outside state but does not execute when the state executes a self-transition.

15. The method of claim 11, further comprising the step of coding all entry codes of all states to null, wherein self-transitions and state transitions to a given state cause entry code associated with the state to execute.

16. The method of claim 11, wherein:

the state is a sub-state of a parent state; and the object-oriented software development program provides a transition to history feature for the applications program wherein, when the applications program is running, a self-transition at the parent state when the parent state is in the sub-state causes entry code of the sub-state to execute.

17. The method of claim 11, wherein the software development program is an object-oriented software development program, wherein each state is a state machine describing the behavior of a corresponding software actor of the applications program.

18. The method of claim 17, wherein the object-oriented software development program is implemented in accordance with the real-time object-oriented modeling (ROOM) methodology.

19. A computer system for running a program, the computer system comprising:

(a) means for performing a state transition to a state of the program from an outside state, where in all state transitions to the state from outside states are connected to an input of a transition merge point of the state;

(b) means for selecting a merge transition of the merge point in response to the state transition; and (c) means for transitioning with the merge transition back to the state, when the merge transition contains merge transition code which executes during the merge transition.

* * * * *